United States Patent
Yang

(10) Patent No.: US 12,089,138 B2
(45) Date of Patent: Sep. 10, 2024

(54) ACCESS CONTROL METHOD AND APPARATUS, AND READABLE STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 430 days.

(21) Appl. No.: 17/609,318

(22) PCT Filed: May 9, 2019

(86) PCT No.: PCT/CN2019/086289
§ 371 (c)(1),
(2) Date: Nov. 5, 2021

(87) PCT Pub. No.: WO2020/223977
PCT Pub. Date: Nov. 12, 2020

(65) Prior Publication Data
US 2022/0217618 A1  Jul. 7, 2022

(51) Int. Cl.
*H04W 72/04* (2023.01)
*H04W 28/02* (2009.01)
*H04W 48/04* (2009.01)
*H04W 48/10* (2009.01)

(52) U.S. Cl.
CPC ....... *H04W 48/10* (2013.01); *H04W 28/0268* (2013.01); *H04W 48/04* (2013.01)

(58) Field of Classification Search
CPC . H04W 48/10; H04W 28/0268; H04W 48/04; H04W 92/18; H04W 48/02; H04W 74/006; H04W 4/40; H04W 72/542
See application file for complete search history.

(56) References Cited

U.S. PATENT DOCUMENTS

| | | | | |
|---|---|---|---|---|
| 2011/0065471 | A1* | 3/2011 | Selen | H04W 24/08 455/509 |
| 2018/0199263 | A1* | 7/2018 | Huang-Fu | H04W 28/0289 |
| 2018/0352579 | A1* | 12/2018 | Agardh | H04L 25/0204 |
| 2020/0304159 | A1* | 9/2020 | Liao | H04W 72/23 |
| 2021/0127407 | A1* | 4/2021 | Shapin | H04L 1/1854 |

FOREIGN PATENT DOCUMENTS

| | | |
|---|---|---|
| CN | 104796881 A | 7/2015 |
| CN | 108024264 A | 5/2018 |

OTHER PUBLICATIONS

VIVO "Discussion on support of simultaneous mode 1 and mode 2" 3GPP TSG-RAN WG2 Meeting #103; R2-1901118, Feb. 2019; 4 pages (Year: 2019).*
International Patent Application No. PCT/CN2019/086289 International Search Report dated Jan. 8, 2020, 2 pages.

* cited by examiner

*Primary Examiner* — Lan-Huong Truong
(74) *Attorney, Agent, or Firm* — Cozen O'Connor

(57) ABSTRACT

An access control method. The method is applied to a terminal. The terminal generates a random probability value for target data, acquires a probability threshold corresponding to a PQI of the target data, and acquires an access control result according to the random probability value and the probability threshold, wherein the access control result is configured to indicate whether an access control of the target data is successful.

15 Claims, 3 Drawing Sheets

ACCESS CONTROL METHOD AND APPARATUS, AND READABLE STORAGE MEDIUM

CROSS-REFERENCE TO RELATED APPLICATION

This application is the US national phase application of International Application No. PCT/CN2019/086289, filed on May 9, 2019, the entire contents of which are incorporated herein by reference.

TECHNICAL FIELD

The disclosure relates to a field of wireless communication technologies, and particularly to a method and an apparatus for access control and a readable storage medium.

BACKGROUND

With the development of wireless communication technologies, a growing number of methods for transmitting data between terminals has been developed. Transmission by a sidelink has become one of the main ways of a near field communication technology.

In the related art, when data is transmitted between terminals by a sidelink technology, it is often necessary to select a corresponding sidelink resource and transmit data on the selected sidelink resource. When a network is congested where a terminal transmitting data is located (for example, other terminals near the terminal are transmitting data by using the same sidelink resource), data transmission failure may occur.

SUMMARY

According to a first aspect of embodiments of the disclosure, a method for access control is provided. The method is executed by a terminal, and includes: generating a random probability value for target data, wherein the target data is data configured to be transmitted by a sidelink; acquiring a probability threshold corresponding to a PC5 Quality of Service Indication (PQI) of the target data; and acquiring an access control result based on the random probability value and the probability threshold, wherein the access control result is configured to indicate whether an access control of the target data is successful.

According to a second aspect of embodiments of the disclosure, an apparatus for access control is provided. The apparatus is applied to a terminal, and includes: a processor; and a memory configured to store instructions executable by the processor. The processor is configured to: generate a random probability value for target data, wherein the target data is data configured to be transmitted by a sidelink; acquire a probability threshold corresponding to a PC5 Quality of Service Indication (PQI) of the target data; and acquire an access control result based on the random probability value and the probability threshold, wherein the access control result is configured to indicate whether an access control of the target data is successful.

According to a third aspect of embodiments of the disclosure, a non-transitory computer readable storage medium is provided. The computer readable storage medium includes executable instructions that, when executed by a processor in a terminal, cause the processor to implement the method for access control in the first aspect.

It should be understood that, the above general descriptions and latter detailed descriptions are only illustrated, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Figure 1:
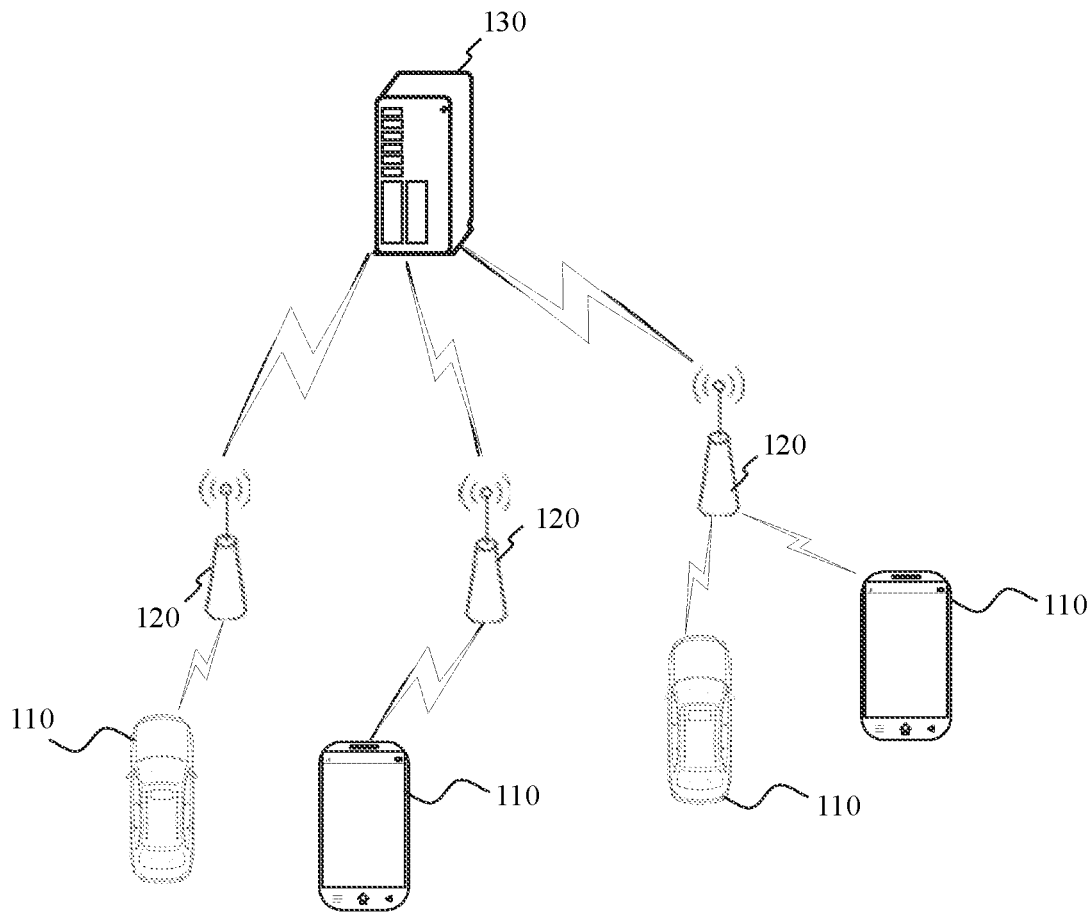
FIG. 1 is a diagram of a scene of an implementation environment involved in a method for access control provided in embodiments of the disclosure.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

It should be understood that, "several" mentioned in the disclosure refers to one or more, and "a plurality of" refers to two or more than two. "and/or" describes an association relationship of the associated objects, and represents that there may be three relationships, for example, A and/or B, may represent: A exists alone, both A and B exist, and B exists alone. The character "/" generally represents an "or" relationship of the associated objects. For convenience of understanding, some nouns and application scenes in the disclosure are briefly introduced below.

A sidelink technology is a near field communication technology in which terminals communicate directly with each other through a wireless interface (such as a PC5 interface).

In the 4th generation mobile communication (4G) system, that is, in a long term evolution (LTE) system, sidelink data transmission may multiplex an uplink transmission resource of a Uu interface, and terminals for transmitting sidelink data may share the used transmission resources. A base station may broadcast information such as a system information block (SIB), and carry a resource pool configuration of a sidelink in the cell by the SIB, so that the terminal in the idle state may acquire wireless resources available for sidelink sending and receiving by reading broadcast information. Resource pools in different application scenes may be configured independently. For example, in scenarios such as vehicle to vehicle (V2V) communication, vehicle to infrastructure (V2I) communication and vehicle to pedestrian (V2P) communication in vehicle to everything (V2X) communication, different sidelink resource pools may be configured. A sidelink resource pool configuration may refer to a sidelink resource pool, and may refer to a list of a plurality of sidelink resource pools.

Optionally, in order to avoid that terminals close to each other select the same resource pool, the base station may divide a cell into a plurality of zones, and before selecting the sidelink resource pool, the terminal may first determine which zone it is located, and then select a corresponding resource pool in the zone to transmit sidelink data. For example, the base station may carry configuration information of the divided plurality of zones in the broadcast. The configuration information may include a geographical length of each zone, a geographic width of each zone, a reference point of the base station, and a resource pool corresponding to each zone. After receiving configuration information in the broadcast of the base station, the terminal may acquire the resource pool of the zone where the terminal is located, thereby transmitting sidelink data according to the resource pool.

Before transmitting data on a sidelink, the terminal detects transmitting energy on the sidelink to obtain a channel congestion rate (CBR) of a certain transmission resource pool, which represents a situation the resource in the transmission resource pool is occupied, and the terminal select a different transmission resource pool to transmit sidelink data according to the CBR. For example, the terminal may select a resource in a resource pool with a lower CBR to transmit sidelink data.

In a 5G new radio (5G NR) system, quality of service (QoS) of sidelink data may be indicated by a 5G QoS Identifier (5QI). The 5QI indicates a priority, a time delay, a bit error rate, etc. of the data.

An application (APP) layer may indicate which sidelink wireless access technology type needs to be used by the sidelink data. Such an indication may be that only an LTE may be used, only an NR may be used, or both may be used.

When the terminal transmits data through a sidelink, the terminal does not support access control, and after selecting a corresponding resource pool, the terminal directly transmits data through a sidelink. When the sidelink resource that needs to be used by the terminal is occupied by other terminals, the terminal fails to transmit data through a sidelink, and the application layer may not know that the data fails to be transmitted through the sidelink, so that the terminal may be in a data transmission failure state for a long time, which may lead to service interruptions and affect data transmission efficiency.

FIG. 1 is a diagram illustrating a scene of an implementation environment involved in a method for access control provided in embodiments of the disclosure. As illustrated in FIG. 1, the implementation environment may include several terminals 110 and several base stations 120.

The terminal 110 is a wireless communication device supporting a plurality of wireless access technologies for sidelink transmission. For example, the terminal 110 may support cellular mobile communication technologies, for example, the 4th generation mobile communication (4G) technology and a 5G technology. Alternatively, the terminal 110 may also support a next generation mobile communication technology of the 5G technology.

For example, the terminal 110 may be a vehicle-mounted communication device, for example, may be a vehicle computer having a wireless communication function, or a wireless communication device externally connected to the vehicle computer.

Alternatively, the terminal 110 may also be a roadside device, for example, may be a street lamp having a wireless communication function, a signal lamp, or other roadside devices.

Alternatively, the terminal 110 may also be a user terminal device, such as a mobile phone (or referred to as a "cellular" phone) and a computer having a mobile terminal, for example, a portable, pocket-sized, handheld, computer built-in or vehicle-mounted mobile apparatus, for example, a station (STA), a subscriber unit, a subscriber station, a mobile station, a mobile, a remote station, an access point, a remote terminal, an access terminal, a user terminal, a user agent, a user device or a user equipment (UE). For example, the terminal 110 may be a mobile terminal such as a smart phone, a tablet computer, an e-book reader, etc., or may be a smart wearable device such as smart glasses, a smart watch, or a smart wristband.

The base station 120 may be a network side device in a wireless communication system. The wireless communication system may be a 4G system, referred to as a long term evolution (LTE) system. Alternatively, the wireless communication system may also be a 5G system, also referred to as a new radio (NR) system. Alternatively, the wireless communication system may also be a next-generation system of the 5G system.

The base station 120 may be an evolved base station (eNB) employed in the 4G system. Alternatively, the base station 120 may also be a base station (gNB) employing a centralized distributed architecture in the 5G system. When the base station 120 employs the centralized distributed architecture, a central unit (CU) and at least two distributed units (DUs) are usually included. Protocol stacks at a packet data convergence protocol (PDCP) layer, a radio link control (RLC) layer and a media access control (MAC) layer are arranged in the centralized unit; protocol stacks at a physical (PHY) layer are arranged in the distributed unit. The specific implementation of the base station 120 is not limited in embodiments of the disclosure.

A wireless connection may be established between the base station 120 and the terminal 110 through a wireless air interface. In different embodiments, the wireless air interface is a wireless air interface based on a 4G standard; or the wireless air interface is a wireless air interface based on a 5G standard, for example, the wireless air interface is a new air interface; or the wireless air interface may also be a wireless air interface based on a next generation mobile communication network technology standard of 5G.

Optionally, the wireless communication system may further include a network management device 130.

Several base stations 120 are respectively connected to the network management device 130. The network management device 130 may be a core network device in the wireless communication system. For example, the network management device 130 may be a mobility management entity (MME) in an evolved packet core network (EPC). Alternatively, the network management device may be other core network device, such as a serving gateway (SGW), a public data network gateway (PGW), a policy and charging rules function (PCRF), or a home subscriber server (HSS). The implementation form of the network management device 130 is not limited in embodiments of the present disclosure.

Figure 2:
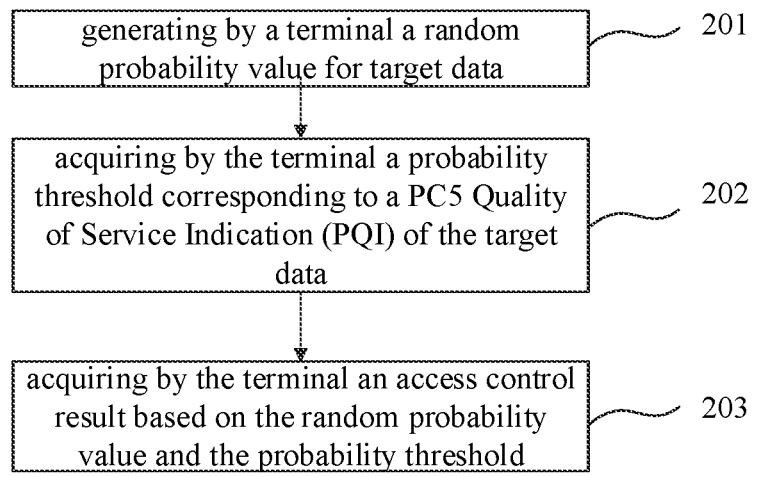
FIG. 2 is a flowchart of a method for access control provided in embodiments of the disclosure.

FIG. 2 is a flowchart illustrating a method for access control provided in embodiments of the disclosure. As illustrated in FIG. 2, the method for transmitting data is applied to the implementation environment as illustrated in FIG. 1 and executed by the terminal in the wireless communication environment. The method may include the following steps.

At step 201, the terminal generates a random probability value for target data.

The target data is data configured to be transmitted by a sidelink.

At step 202, the terminal acquires a probability threshold corresponding to a PC5 Quality of Service Indication (PQI) of the target data.

At step 203, the terminal acquires an access control result based on the random probability value and the probability threshold.

The access control result is configured to indicate whether an access control of the target data is successful.

Optionally, acquiring the probability threshold corresponding to the PQI of the target data, includes: querying, from an access control parameter combination, access control parameters corresponding to the PQI of the target data, wherein the access control parameter combination includes access control parameters corresponding to at least one PQI; and acquiring a probability threshold included in the queried access control parameters.

Optionally, before acquiring the probability threshold corresponding to the PQI of the target data, the method further includes: receiving access control parameter configuration information transmitted by a base station through a broadcast message, wherein the access control parameter configuration information is configured to indicate access control parameters corresponding to each location zone; and acquiring an access control parameter combination based on the access control parameter configuration information, wherein the access control parameter combination includes access control parameters corresponding to a location zone where the terminal is located.

Optionally, the access control parameter configuration information includes an identifier of access control parameters corresponding to the each location zone; before receiving access control parameter configuration information transmitted by a base station through a broadcast message, the method further includes: receiving an access control parameter set broadcast by the base station, the access control parameter set including respective groups of access control parameters configured by the base station; acquiring an access control parameter combination based on the access control parameter configuration information, includes: acquiring an access control parameter combination from the access control parameter set based on an identifier of access control parameters corresponding to a location zone where the terminal is located.

Optionally, the method further includes: when access control parameters corresponding to the PQI of the target data are not found, determining that the access control of the target data is successful.

Optionally, acquiring an access control result based on the random probability value and the probability threshold, includes: acquiring an access control result based on a magnitude relationship between the random probability value and the probability threshold.

Optionally, the access control parameters corresponding to the PQI of the target data further include an access control duration, and the method further includes: when the access control result indicates that the access control of the target data fails, transmitting a duration notification to an application layer, wherein the duration notification is configured to instruct the application layer to transmit the target data in a manner other than through a sidelink; and transmitting a notification of an access control failure of the target data to a non access stratum (NAS).

Optionally, the method further includes: when the access control result indicates that the access control of the target data is successful, transmitting the target data by a sidelink.

In summary, the terminal generates the random probability value for the target data, in which the target data is data configured to be transmitted by the sidelink; acquires the probability threshold corresponding to the PQI of the target data; and acquires the access control result based on the random probability value and the probability threshold, in which the access control result is configured to indicate whether the access control of the target data is successful. In the present disclosure, the terminal generates the random probability value for the target data sent by the sidelink, and compares the random probability value with the acquired probability threshold corresponding to the PQI of the target data to acquire an access control result, such that the terminal may know whether the access control of the target data is successful, thereby realizing access control of data transmitted by the sidelink, preventing the problem of service interruptions caused when the terminal fails to directly transmit the target data by the sidelink, and improving the efficiency of the terminal transmitting the target data.

Figure 3:
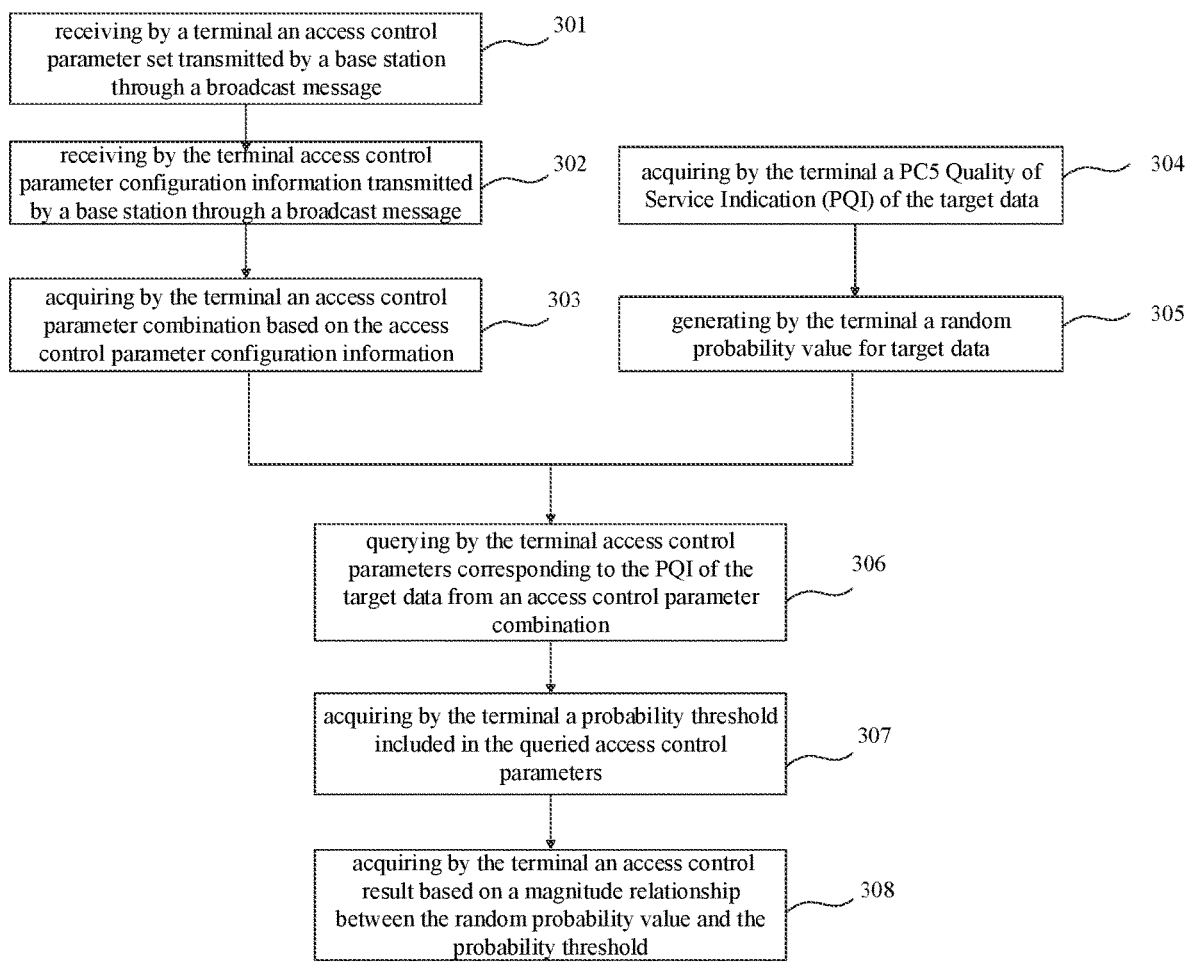
FIG. 3 is a flowchart of a method for access control provided in embodiments of the disclosure.

In a possible implementation, the disclosure provides a method for access control. FIG. 3 is a flowchart illustrating a method for access control provided in embodiments of the disclosure. The method may be applied to the implementation environment as illustrated in FIG. 1 and executed by a terminal in the wireless communication environment. As illustrated in FIG. 3, the method may include the following steps.

At step 301, the terminal receives an access control parameter set transmitted by a base station through a broadcast message.

The access control parameter set includes respective groups of access control parameters configured by the base station.

In embodiments of the present disclosure, the base station can configure a plurality of groups of access control parameters in a cell range of its own cell, and transmits these access control parameters out by taking them as an access control parameter set carried in a broadcast message of the base station, so that the terminal may receive the access control parameter set allocated by the base station. Therefore, when the terminal in the cell range of the base station transmits data through a sidelink, access control may be supported.

Optionally, each group of access control parameters included in the access control parameter set may include a corresponding PQI list, an access probability threshold and an access control duration. Table 1 schematically illustrates access control parameters provided in embodiments of the disclosure.

TABLE 1

| Parameter Identifier | PQI | access probability threshold | access control duration |
|---|---|---|---|
| (1) | 1, 2 | 0.6 | 500 ms |
| (2) | 1, 2 | 0.1 | 500 ms |
| (3) | 3, 4 | 0.9 | 500 ms |
| (4) | 5 | 1.0 | 500 ms |
| . . . | . . . | . . . | . . . |

As illustrated in Table 1, the access control parameter set configured by the base station includes a PQI list, an access probability threshold and an access control duration of different PQIs in each zone. The value in the PQI list may include PQI values available for transmitting sidelink data in the sidelink resource pool. For example, the base station supports transmission of sidelink data with a PQI value of 1 to 100, and the base station may select a part of PQIs as a PQI list in the access control parameter set, for example, select PQI values of 1 to 5, to generate Table 1 prestored in the base station. That is, the base station pre-stores an access control parameter set, and the base station may broadcast the access control parameter set through a system radio, so that the terminal in the cell controlled by the base station receives the access control parameter set.

Optionally, the above Table 1 may be a set of access control parameters respectively configured by the base station for each zone divided by itself. For example, in Table 1, the access control parameters corresponding to the parameter identifier (1) may be a group of access control parameters configured by the base station for zone 1, and the access control parameters corresponding to the parameter identifier (2) may be a group of access control parameters configured by the base station for zone 2. When the base station transmits the access control parameter set through broadcast, each group of access control parameters may be integrated and transmitted through broadcast.

At step 302, the terminal receives access control parameter configuration information transmitted by the base station through a broadcast message.

The access control parameter configuration information may be configured to indicate access control parameters corresponding to each location zone.

In embodiments of the disclosure, the base station may divide a cell into a plurality of zones, and the access control parameters in different zones are not the same. Taking Table 1 as an example, in a possible implementation, the base station divides its cell range into 3 zones, that is, zone a, zone b and zone c. In zone a, the access control parameters allocated by the base station for zone a include item (1), item (3) and item (4) in Table 1; in zone b, the access control parameters allocated by the base station for zone b include item (2), item (3) and item (4) in Table 1; in zone c, the access control parameter allocated by the base station for zone c include item (5) in Table 1, etc. In order to enable the terminal to know the access control parameters configured by the base station in the zone where the terminal is located, the base station may carry access control parameter configuration information when transmitting the access control parameter set, and the transmits access control parameter configuration information through the broadcast message of the base station, so that the terminal may acquire the access control parameter configuration information by receiving the broadcast message transmitted by the base station.

In another possible implementation, after broadcasting the access control parameter set, the base station transmits or updates the access control parameter configuration information again through broadcast, that is, the base station broadcasts the access control parameter configuration information at some time point after broadcasting the access control parameter set.

In a possible implementation, the base station may generate corresponding access control parameter configuration information for the access control parameters allocated corresponding to zone a, zone b and zone c respectively. For example, zone a corresponds to access control parameter configuration information a, zone b corresponds to access control parameter configuration information b, and zone c corresponds to access control parameter configuration information c, etc. The base station transmits access control parameter configuration information a, access control parameter configuration information b, access control parameter configuration information c and other access control parameter configuration information through broadcast when transmitting the access control parameter set or after transmitting the access control parameter set, and correspondingly, the terminal may acquire the access control parameter configuration information carried therein when receiving the broadcast message transmitted by the base station.

At step 303, the terminal acquires an access control parameter combination based on the access control parameter configuration information.

The access control parameter combination includes access control parameters corresponding to the location zone where the terminal is located, and includes access control parameters corresponding to at least one PQI.

Optionally, in embodiments of the present disclosure, the terminal may further acquire the access control parameter combination from the access control parameter set based on the access control parameter configuration information when acquiring the access control parameter configuration information. For example, the terminal acquires the access control parameter configuration information b from the message broadcast by the base station, and the access control parameter configuration information b directly indicates that the terminal acquires_a part of access control parameters in Table 1. That is, the terminal may acquire the access control parameter combination consisting of item (2), item (3) and item (4) in Table 1 based on the access control parameter configuration information b. Optionally, the terminal may also acquire access control parameter configuration information a from the message broadcast by the base station, and then the terminal may acquire an access control parameter combination consisting of item (1), item (3) and item (4) in Table 1 based on the access control parameter configuration information a. Optionally, when the terminal acquires more than one piece of access parameter configuration information, correspondingly, the terminal may acquire different access control parameter combinations based on different access control parameter configuration information.

In a possible implementation, the access control parameter combination configuration information received by the terminal may further include an identifier of access control parameters corresponding to each location zone. The terminal may acquire the access control parameter combination from the access control parameter set based on the identifier of access control parameters corresponding to the location zone where the terminal is located. For example, the terminal may acquire access control parameter configuration information a, access control parameter configuration information b, access control parameter configuration information c and other access control parameter configuration information from the message broadcast by the base station, each access control parameter configuration information includes an identifier of the corresponding access control parameters, and the terminal may determine the corresponding access control parameter configuration information based on the location zone where the terminal is located, and acquire the access control parameter combination from the access control parameter set based on the identifier of the access control parameters included in the access control parameter configuration information corresponding to the location zone where the terminal is located.

In a possible implementation, the base station may take the parameter identifier in Table 1 as the identifier of the access control parameters in the access control parameter configuration information, and the terminal may acquire the corresponding access control parameter combination from Table 1 based on the parameter identifier (in Table 1) contained in the access control parameter configuration information. For example, in the access control parameter configuration information a corresponding to zone a, the parameter identifiers carried are (1), (3), (4) in Table 1. When the terminal is located in zone a, an access control parameter combination consisting of item (1), item (3) and item (4) is acquired from Table 1 based on the parameter identifiers (1), (3), (4).

At step 304, the terminal acquires a PC5 Quality of Service Indication (PQI) of the target data.

The target data is data configured to be transmitted by a sidelink.

Optionally, in embodiments of the disclosure, the terminal requires that data transmitted by a sidelink is corresponding to its own PQI, and when one sidelink data arrives, the terminal may acquire a PQI corresponding to the sidelink data. For example, when the PQI corresponding to one sidelink data is 1, the PQI of the target data acquired by the terminal is 1. Optionally, the terminal may transmit a plurality of sidelink data at the same moment, and in this case, the terminal may acquire the PQI of each sidelink data. For example, at a certain moment, the terminal needs to transmit sidelink data with the PQI of 1, and also needs to transmit sidelink data with the PQI of 2, in this case, the terminal may acquire two PQI values, that is, 1 and 2.

At step 305, the terminal generates a random probability value for the target data.

Optionally, in embodiments of the disclosure, the terminal may generate one random probability value for the target data. Optionally, the random probability value may be randomly generated by a random number generator in the terminal. For example, the terminal is mounted with a random number generator, and the random number generator may generate any value within 0 to 1. When the terminal needs to transmit target data by a sidelink, the terminal may call the random number generator to generate one random number for the target data and takes the random number as the random probability value of the target data. Optionally, when the terminal needs to transmit a plurality of target data by the sidelink at the same time, the terminal may call the random number generator to generate the same quantity of random numbers for the plurality of target data and takes respective random numbers as random probability values of respective target data.

At step 306, the terminal queries access control parameters corresponding to the PQI of the target data from the access control parameter combination.

In embodiments of the disclosure, the terminal may query access control parameters corresponding to the PQI from the acquired access control parameter combination based on the acquired PQI of the target data. In a possible implementation, the terminal is located in zone a divided by the base station, and the access control parameter combination acquired by the terminal based on the access control parameter configuration information may be an access control parameter combination consisting of item (1), item (3) and item (4) in Table 1. When the PQI value of target data in the terminal is 2, the terminal may query based on the PQI value that the access probability threshold when the access control of the target access is performed is 0.6 and the access control duration is 500 ms.

Optionally, when the terminal finds the control parameters corresponding to the PQI of the target data, step 307 is executed, and when the terminal does not find the access control parameters corresponding to the PQI of the target data, the terminal determines that the access control of the target data may be successful. For example, when the PQI value of the target data in the terminal is 6, the terminal finds that the access control parameter combination does not include access control parameters of the sidelink data with the PQI of 6 after querying the acquired access control parameter combination, and in this case, the terminal may determine by default that the access control of the sidelink data with the PQI of 6 is successful.

At step 307, the terminal acquires a probability threshold included in the queried access control parameters.

Optionally, the terminal may acquire the access probability threshold included in the queried access control parameters. For example, the terminal is still located in zone a divided by the base station, and the access control parameter combination acquired by the terminal may be an access control parameter combination consisting of item (1), item (3) and item (4) in the Table 1. When the target data with the PQI value of 2 in the terminal arrives, and when the terminal acquires that the PQI value of the target data is 2, the terminal may query based on the PQI value that the access probability threshold for the access control of the target data is 0.6, thus acquiring the access probability threshold.

Optionally, when the terminal needs to transmit a plurality of target data, the terminal may query the access control parameter combination based on the plurality of acquired PQIs of the target data. For example, when the terminal needs to transmit target data with the PQI value of 2 and target data with the PQI value of 3, the terminal may query based on the PQI value of 2 and the PQI value of 3 at the same time. The terminal may query that the access probability threshold for the access control of the target data with the PQI value of 2 is 0.6, and the access probability threshold for the access control of the target data with the PQI value of 3 is 0.9. Therefore, the terminal may acquire access probability thresholds corresponding to the PQIs of the target data.

In a possible implementation, when the terminal acquires that the probability threshold included in the queried access control parameters is 1, the terminal may directly determine that the access control of the target data is successful without generating a random number for the target data. For example, the terminal is still located in zone a divided by the base station, and the access control parameter combination acquired by the terminal may be an access control parameter combination consisting of item (1), item (3) and item (4) in Table 1. When the target data with the PQI value of 5 in the terminal arrives, and when the terminal acquires that the PQI value of the target data is 5, the terminal may query based on the PQI value that the access probability threshold for the access control of the target data is 1.0, thereby acquiring the access probability threshold. The terminal may not execute step 305 for the target data, that is, directly determine that the access control of the target data is successful without generating a random number for the target data, and acquire an access control result without executing step 308 for the target data.

At step 308, the terminal acquires an access control result based on a magnitude relationship between the random probability value and the probability threshold.

The access control result may be configured to indicate whether the access control of the target data is successful.

Optionally, the terminal may acquire an access control result based on a magnitude relationship between the generated random probability value and the probability threshold.

In a possible implementation, when the random probability value generated by the terminal for the target data is smaller than the access probability threshold in the access control parameter combination, the access control result acquired by the terminal may indicate that the access control of the target data is successful. When the random probability value generated by the terminal for the target data is greater than the access probability threshold in the access control parameter combination, the access control result acquired by the terminal may indicate that the access control of the target data fails.

For example, when the terminal is located in zone a divided by the base station, the access control parameter combination acquired by the terminal may be an access control parameter combination consisting of item (1), item (3) and item (4) in Table 1. When the target data of the terminal with the PQI value of 1 arrives, and when the terminal acquires that the PQI value of the target data is 1, the terminal may query based on the PQI value that the access probability threshold for the access control of the target data is accessed is 0.6, and the random probability value generated by the terminal through the random number generator is 0.1, then the terminal may compare the generated random probability value 0.1 with the access probability threshold 0.6 to obtain that the generated random probability value is smaller than the access probability threshold. Such the access control result indicates that the access control of the target data with the PQI value of 1 is successful.

Optionally, when the terminal transmits target data with the PQI value of 1 and needs to transmit target data with the PQI value of 2, the terminal may further acquire the PQI value of target value with the PQI value of 2, and query based on the PQI value that the access probability threshold for the access control of the target data is 0.6, and the random probability value generated by the terminal through the random number generator is 0.7, then the terminal may compare the generated random probability value 0.7 with the access probability threshold 0.6 to obtain that the generated random probability value is greater than the access random probability threshold. Such the access control result indicates that the access control of the target data with the PQI value of 2 fails.

In another possible implementation, when the random probability value generated by the terminal for the target data is smaller than the access probability threshold in the access control parameter combination, the access control result acquired by the terminal may indicate that the access control of the target data fails When the random probability value generated by the terminal for the target data is greater than the access probability threshold in the access control parameter combination, the access control result acquired by the terminal may indicate that the access control of the target data is successful.

Optionally, when the access control result acquired by the terminal indicates that the access control of the target data fails, the terminal may transmit a duration notification to an application layer, in which the duration notification is configured to instruct the application layer to transmit the target data in a manner other than through a sidelink. In a possible implementation, the terminal is mounted with a timer. When the access control result indicates that the access control of the target data fails, the terminal starts the timer and maintains the timer according to the access control duration. Optionally, when the terminal queries the access control parameter combination based on the PQI of the target data and acquires the access probability threshold corresponding to the PQI of the target data in the access control parameter combination, the terminal may also acquire the access control duration corresponding to the PQI of the target data in the access control parameter combination, and when the access control result acquired by the terminal indicates that the access control of the target data fails, the terminal starts the timer to maintain the access control duration.

For example, when the terminal is in zone a divided by the base station, and when for the target data with the PQI value of 2, the access control result acquired through above steps indicates that the access control of the target data fails, the terminal may start the timer and maintain the timer with the access control duration (500 ms) corresponding to item (1) in Table 1. The terminal no longer attempts to perform access control for the target data with the same PQI value within the duration when the timer is on. That is, the terminal no longer attempts to perform access control for the target data with the PQI value of 2 within 500 ms. Optionally, the terminal may notify the application layer the on duration of the timer by means of a duration notification, so that the application layer knows that the access control of the sidelink data of the terminal fails. In this case, the application layer may attempt to transmit the target data in a mode other than through the sidelink within the access control duration. Optionally, the application layer may select to transmit target data by means of transmitting data by the LTE, or, the application layer may select to transmit target data by means of transmitting data by the NR.

Optionally, the terminal may further transmit a notification of an access control failure of the target data to a non access stratum (NAS), so that the NAS may know that the access control of the target data fails.

Optionally, when the access control result acquired by the terminal indicates that the access control of the target data is successful or when the terminal determines that the access control of the target data is successful, the terminal may transmit the target data by a sidelink.

In summary, the terminal generates the random probability value for the target data, in which the target data is data configured to be transmitted by the sidelink; acquires the probability threshold corresponding to the PQI of the target data; and acquires the access control result based on the random probability value and the probability threshold, in which the access control result is configured to indicate whether the access control of the target data is successful. In the present disclosure, the terminal generates the random probability value for the target data transmitted by the sidelink, and compares the random probability value with an acquired probability threshold corresponding to the PQI of the target data to acquire the access control result, such that the terminal may know whether the access control of the target data is successful, thereby achieving access control of data transmitted by the sidelink, preventing the problem of service interruptions caused when the terminal fails to directly transmit the target data by the sidelink, and improving the efficiency of the terminal transmitting the target data.

The apparatus embodiments of the disclosure may be configured to execute the method embodiments of the disclosure. For the undisclosed details in apparatus embodiments of the disclosure, reference may be made to method embodiments of the disclosure.

Figure 4:
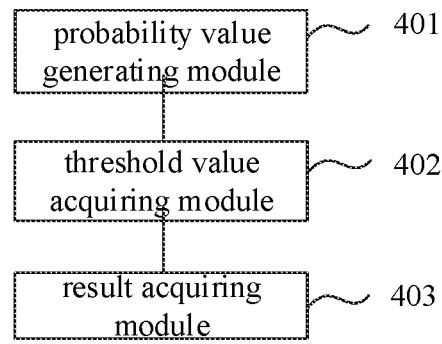
FIG. 4 is a block diagram of an apparatus for access control according to an example embodiment.

FIG. 4 is a block diagram illustrating an apparatus for transmitting information according to an example embodiment. As illustrated in FIG. 4, the apparatus for access control may be implemented as the whole or a part of the terminal in the implementation environment as illustrated in FIG. 1 by hardware or a combination of hardware and software, to execute the steps executed by the terminal in any one embodiment in FIG. 2 or FIG. 3. The apparatus for access control may include a probability value generating module 401, a threshold acquiring module 402, and a result acquiring module 403.

The probability value generating module 401 is configured to generate a random probability value for target data, in which the target data is data configured to be transmitted by a sidelink.

The threshold acquiring module 402 is configured to acquire a probability threshold corresponding to a PC5 Quality of Service Indication (PQI) of the target data.

The result acquiring module 403 is configured to acquire an access control result based on the random probability value and the probability threshold, in which the access control result is configured to indicate whether an access control of the target data is successful.

Optionally, the threshold acquiring module 402 includes a parameter acquiring submodule and a threshold acquiring submodule.

The parameter acquiring submodule is configured to query, from an access control parameter combination, access control parameters corresponding to the PQI of the target data, the access control parameter combination including access control parameters corresponding to at least one PQI.

The threshold acquiring submodule is configured to acquire the probability threshold included in the queried access control parameters.

Optionally, the apparatus further includes an information receiving module and a combination acquiring module.

The information receiving module is configured to, before the threshold acquiring module acquires the probability threshold corresponding to the PQI of the target data, receive access control parameter configuration information transmitted by a base station through a broadcast message, in which the access control parameter configuration information is configured to indicate access control parameters corresponding to each location zone.

The combination acquiring module is configured to acquire the access control parameter combination based on the access control parameter configuration information, the access control parameter combination including access control parameters corresponding to a location zone where the terminal is located.

Optionally, the access control parameter configuration information includes an identifier of access control parameters corresponding to each location zone, and the apparatus further includes a parameter set acquiring module.

The parameter set acquiring module is configured to, before the information receiving module receives access control parameter configuration information transmitted by the base station through the broadcast message, receive an access control parameter set broadcast by the base station, the access control parameter set including respective groups of access control parameters configured by the base station.

The combination acquiring module is configured to acquire the access control parameter combination from the access control parameter set based on an identifier of access control parameters corresponding to a location zone where the terminal is located.

Optionally, the apparatus further includes a determining module configured to, when access control parameters corresponding to the PQI of the target data are not found, determine that the access control of the target data is successful.

Optionally, the result acquiring module is configured to acquire the access control result based on a magnitude relationship between the random probability value and the probability threshold.

Optionally, the access control parameters corresponding to the PQI of the target data further include an access control duration; the apparatus further includes a duration notification transmitting module and a failure notification transmitting module.

The duration notification transmitting module is configured to, when the access control result indicates that the access control of the target data fails, transmit a duration notification to an application layer, in which the duration notification is configured to instruct the application layer to transmit the target data in a manner other than through a sidelink.

The failure notification transmitting module is configured to transmit a notification of an access control failure of the target data to a non access stratum (NAS).

Optionally, the apparatus further includes a data transmitting module configured to, when the access control result indicates that the access control of the target data is successful, transmit the target data by a sidelink.

It should be noted that, when the apparatus provided in the above embodiments implements its function, the division of the above function modules is only illustrated as an example. In practical applications, the above function may be allocated to different function modules according to actual requirements, that is, the content structure of the device is divided into different function modules to complete all or part of functions described above.

With regard to the apparatus in the embodiments, the specific way in which each module performs the operation has been described in detail in the embodiments of the method and will not be elaborated here.

An example embodiment in the disclosure provides an apparatus for access control that may implement all or a part of steps executed by a terminal in embodiments as illustrated in FIG. 2 or FIG. 3. The apparatus for access control includes a processor and a memory configured to store instructions executable by a processor.

The processor is configured to: generate a random probability value for target data, in which the target data is data configured to be transmitted by a sidelink; acquire a probability threshold corresponding to a PC5 Quality of Service Indication (PQI) of the target data; and acquire an access control result based on the random probability value and the probability threshold, in which the access control result is configured to indicate whether an access control of the target data is successful.

Optionally, acquiring the probability threshold corresponding to the PQI of the target data, includes: querying, from an access control parameter combination, access control parameters corresponding to the PQI of the target data, the access control parameter combination including access control parameters corresponding to at least one PQI; and acquiring the probability threshold contained in the queried access control parameters.

Optionally, before acquiring the probability threshold corresponding to the PQI of the target data, the processor is further configured to: receive access control parameter configuration information transmitted by a base station through a broadcast message, wherein the access control parameter configuration information is configured to indicate access control parameters corresponding to each location zone; and acquire the access control parameter combination based on the access control parameter configuration information, wherein the access control parameter combination includes access control parameters corresponding to a location zone where the terminal is located.

Optionally, the access control parameter configuration information includes an identifier of access control parameters corresponding to each location zone; before receiving access control parameter configuration information transmitted by a base station through a broadcast message, the processor is further configured to: receive an access control parameter set broadcast by the base station, the access control parameter set including respective groups of access control parameters configured by the base station; for acquiring the access control parameter combination based on the access control parameter configuration information, the processor is configured to: acquire the access control parameter combination from the access control parameter set based on an identifier of access control parameters corresponding to a location zone where the terminal is located.

Optionally, the processor is further configured to: when access control parameters corresponding to the PQI of the target data are not found, determine that the access control of the target data is successful.

Optionally, for acquiring the access control result based on the random probability value and the probability threshold, the processor is configured to: acquire the access control result based on a magnitude relationship between the random probability value and the probability threshold.

Optionally, the access control parameters corresponding to the PQI of the target data further include an access control duration, and the processor is further configured to: when the access control result indicates that the access control of the target data fails, transmit a duration notification to an application layer, wherein the duration notification is configured to instruct the application layer to transmit the target data in a manner other than through a sidelink; and transmit a notification of an access control failure of the target data to a non-access stratum (NAS).

Optionally, the processor is further configured to: when the access control result indicates that the access control of the target data is successful, transmit the target data by a sidelink.

The solution provided by embodiments of the disclosure is introduced mainly by taking a terminal as an example. It may be understood that, the terminal includes hardware structures and/or software modules to perform respective functions. The modules and algorithm steps of the examples described in connection with the embodiments disclosed herein may be implemented by a hardware or a combination of a hardware and a computer software. Whether a certain function is performed by a hardware or a software depends on particular applications and design constraints of the technical solution. Those skilled in the art may implement the described functions for each particular application with different methods, however, the implementation should not be considered beyond the scope of the technical solution in embodiments of the disclosure.

Figure 5:
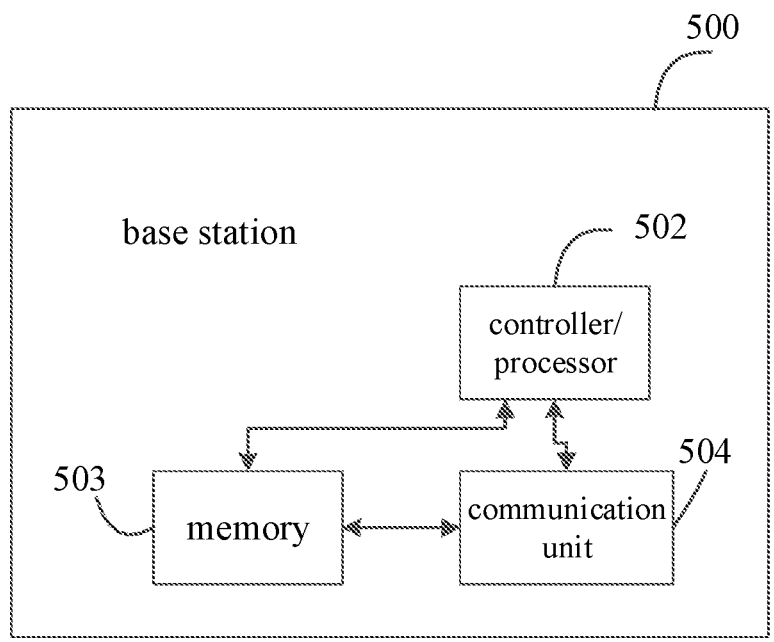
FIG. 5 is a diagram of a structure of a terminal according to an example embodiment.

FIG. 5 is a diagram illustrating a structure of a terminal according to an example embodiment.

A terminal 500 includes a communication unit 504 and a processor 502. The processor 502 may also be a controller, and represented as "a controller/processor 502" in FIG. 5. The communication unit 504 is configured to support the terminal to communicate with other network devices (for example, other terminals, a gateway, etc.).

Further, the terminal 500 may further include a memory 503 configured to store program codes and data of the terminal 500.

It may be understood that, FIG. 5 only illustrates a simplified design of the terminal 500. In practical applications, the terminal 500 may include any number of processors, controllers, memories, communication units, etc. and any terminal that may implement embodiments of the disclosure is within the protection scope of embodiments of the disclosure.

Those skilled in the art should realize that, in one or more examples above, the functions described in embodiments of the present disclosure may be implemented by a hardware, a software, a firmware, or any combination thereof. When implemented by a software, the functions may be stored in a computer readable medium or transmitted as one or more instructions or codes on a computer readable medium. A computer readable medium includes a computer storage medium and a communication medium, the communication medium including any medium that facilitates transmitting a computer program from one place to another. The storage medium may be any available medium accessible by a general-purpose or a special purpose computer.

Embodiments of the present disclosure further provide a computer storage medium configured to store computer software instructions used by the terminal, the computer software instruction including a program designed for executing the method for access control.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for access control, wherein, the method is executed by a terminal, the method comprising:
generating a random probability value for target data, wherein the target data is data configured to be transmitted by a sidelink;
acquiring a probability threshold corresponding to a PC5 Quality of Service Indication, PQI, of the target data; and
acquiring an access control result based on the random probability value and the probability threshold, wherein the access control result is configured to indicate whether an access control of the target data is successful.

2. The method of claim 1, wherein acquiring the probability threshold corresponding to the PQI of the target data comprises:
querying, from an access control parameter combination, access control parameters corresponding to the PQI of the target data, the access control parameter combination comprising access control parameters corresponding to at least one PQI; and
acquiring the probability threshold contained in the queried access control parameters.

3. The method of claim 2, wherein, before acquiring the probability threshold corresponding to the PQI of the target data, further comprising:
receiving access control parameter configuration information transmitted by a base station through a broadcast message, wherein the access control parameter configuration information is configured to indicate access control parameters corresponding to each location zone; and
acquiring the access control parameter combination based on the access control parameter configuration information, the access control parameter combination comprising access control parameters corresponding to a location zone where the terminal is located.

4. The method of claim 3, wherein the access control parameter configuration information comprises an identifier of access control parameters corresponding to each location zone;
before receiving the access control parameter configuration information transmitted by the base station through the broadcast message, further comprising:
receiving an access control parameter set broadcast by the base station, the access control parameter set comprising respective groups of access control parameters configured by the base station;
acquiring the access control parameter combination based on the access control parameter configuration information, comprises:
acquiring the access control parameter combination from the access control parameter set based on the identifier of access control parameters corresponding to the location zone where the terminal is located.

5. The method of claim 2, further comprising:
when access control parameters corresponding to the PQI of the target data are not found, determining that the access control of target data is successful.

6. The method of claim 2, wherein the access control parameters corresponding to the PQI of the target data further comprise an access control duration, the method further comprising:
when the access control result indicates that the access control of the target data fails, transmitting a duration notification to an application layer, wherein the duration notification is configured to instruct the application layer to transmit the target data in a manner other than through a sidelink; and
transmitting a notification of an access control failure of the target data to a non access stratum, NAS.

7. The method of claim 1, wherein acquiring the access control result based on the random probability value and the probability threshold comprises:
acquiring the access control result based on a magnitude relationship between the random probability value and the probability threshold.

8. A non-transitory computer readable storage medium, stored therein with executable instructions that, when executed by a processor in a terminal, cause the terminal to implement the method for access control of claim 1, the method comprising:
generating a random probability value for target data, wherein the target data is data configured to be transmitted by a sidelink;
acquiring a probability threshold corresponding to a PC5 Quality of Service Indication, PQI, of the target data; and
acquiring an access control result based on the random probability value and the probability threshold, wherein the access control result is configured to indicate whether an access control of the target data is successful.

9. An apparatus for access control, comprising:
a processor; and
a memory configured to store instructions executable by the processor,
wherein the processor is configured to execute instructions stored in the memory, so as to:
generate a random probability value for target data, wherein the target data is data configured to be transmitted by a sidelink;
acquire a probability threshold corresponding to a PC5 Quality of Service Indication, PQI, of the target data; and
acquire an access control result based on the random probability value and the probability threshold, wherein the access control result is configured to indicate whether an access control of the target data is successful.

10. The apparatus of claim 9, wherein the processor is configured to:
query, from an access control parameter combination, access control parameters corresponding to the PQI of the target data, the access control parameter combination comprising access control parameters corresponding to at least one PQI; and
acquire the probability threshold contained in the queried access control parameters.

11. The apparatus of claim 10, wherein the processor is further configured to:
acquiring the probability threshold corresponding to the PQI of the target data, receive access control parameter configuration information transmitted by a base station through a broadcast message, wherein the access control parameter configuration information is configured to indicate access control parameters corresponding to each location zone; and
acquire the access control parameter combination based on the access control parameter configuration information, the access control parameter combination comprising access control parameters corresponding to a location zone where the terminal is located.

12. The apparatus of claim 11, wherein the access control parameter configuration information comprises an identifier of access control parameters corresponding to each location zone;
the processor is further configured to:
receiving the access control parameter configuration information transmitted by the base station through the broadcast message, receive an access control parameter set broadcast by the base station, the access control parameter set comprising respective groups of access control parameters configured by the base station;
acquire the access control parameter combination from the access control parameter set based on the identifier of access control parameters corresponding to the location zone where the terminal is located.

13. The apparatus of claim 10, wherein the processor is further configured to:

when the access control parameters corresponding to the PQI of the target data are not found, determine that the access control of the target data is successful.

14. The apparatus of claim 10, wherein, the access control parameters corresponding to the PQI of the target data further comprise an access control duration;

the processor is further configured to:

when the access control result indicates that the access control of the target data fails, transmit a duration notification to an application layer, wherein the duration notification is configured to instruct the application layer to transmit the target data in a manner other than through a sidelink; and transmit a notification of an access control failure of the target data to a non access stratum, NAS.

15. The apparatus of claim 9, wherein the processor is configured to acquire the access control result based on a magnitude relationship between the random probability value and the probability threshold.

\* \* \* \* \*